US010906411B2

(12) United States Patent
Finodeyev et al.

(10) Patent No.: US 10,906,411 B2
(45) Date of Patent: *Feb. 2, 2021

(54) POWER SUPPLY SYSTEM AND METHOD FOR A MOVABLE VEHICLE WITHIN A STRUCTURE

(71) Applicant: Hyperloop Technologies, Inc., Los Angeles, CA (US)

(72) Inventors: Filip Finodeyev, Laguna Niguel, CA (US); Joshua Giegel, Hawthorne, CA (US); Brogan Bambrogan, Los Angeles, CA (US); George O'Neal, Scotts Valley, CA (US); Kaveh Hosseini, Pasadena, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 475 days.

This patent is subject to a terminal disclaimer.

(21) Appl. No.: 15/689,860

(22) Filed: Aug. 29, 2017

(65) Prior Publication Data

US 2018/0022219 A1 Jan. 25, 2018

Related U.S. Application Data

(63) Continuation of application No. 15/007,974, filed on Jan. 27, 2016, now Pat. No. 9,764,648.
(Continued)

(51) Int. Cl.
*B60L 50/90* (2019.01)
*B60L 50/53* (2019.01)

(52) U.S. Cl.
CPC ............ *B60L 50/90* (2019.02); *B60L 50/53* (2019.02); *Y02T 10/70* (2013.01)

(58) Field of Classification Search
CPC ........ B60L 11/002; B60L 50/53; B60L 50/90; Y02T 10/7005; F02C 1/00; F02K 3/115; F01K 3/00; F24H 3/00
(Continued)

(56) References Cited

U.S. PATENT DOCUMENTS

| 131,322 A | 9/1872 | Anderson |
| 2,296,771 A | 9/1942 | Crawford et al. |

(Continued)

FOREIGN PATENT DOCUMENTS

| EP | 2371613 | 10/2011 |
| WO | WO2003002370 | 1/2003 |

(Continued)

OTHER PUBLICATIONS

Musk, E., "Hyperloop White Paper," dated Aug. 12, 2013.
(Continued)

*Primary Examiner* — Carlos Amaya
(74) *Attorney, Agent, or Firm* — Greenblum & Bernstein, P.L.C.

(57) ABSTRACT

System for converting transmitted energy to vehicle movement and power conversion system movable within a waveguide. System for converting transmitted energy to vehicle movement includes a structure having an elongated tubular interior; a movable vehicle structured and arranged to move through the elongated tubular interior; at least one energy source arranged at a fixed location within the elongated tubular interior to transmit energy; and a receiver, carried by the movable vehicle, configured to receive the transmitted energy from the at least one energy source and to convert the received energy into at least one of electrical power and thrust for moving the vehicle.

30 Claims, 11 Drawing Sheets

Related U.S. Application Data

(60) Provisional application No. 62/243,903, filed on Oct. 20, 2015, provisional application No. 62/113,511, filed on Feb. 8, 2015.

(58) Field of Classification Search
USPC .......................................................... 307/9.1
See application file for complete search history.

(56) References Cited

U.S. PATENT DOCUMENTS

| | | | |
|---|---|---|---|
| 2,488,287 A | 11/1949 | Goddard | |
| 2,511,979 A | 6/1950 | Goddard | |
| 2,791,633 A | 9/1956 | Sindzinski | |
| 2,956,823 A | 10/1960 | Benjamin, Jr. et al. | |
| 3,006,288 A | 10/1961 | Brown | |
| 3,083,528 A * | 4/1963 | Brown | F03H 1/00 |
| | | | 60/203.1 |
| 3,100,454 A | 8/1963 | Dennis | |
| 3,132,416 A | 5/1964 | Hait | |
| 3,233,559 A | 2/1966 | Smith et al. | |
| 3,605,629 A | 9/1971 | Edwards | |
| 3,610,163 A | 10/1971 | Edwards | |
| 3,738,281 A | 6/1973 | Waidelich | |
| 3,750,803 A | 8/1973 | Paxton | |
| 3,768,417 A | 10/1973 | Thornton et al. | |
| 3,776,141 A | 12/1973 | Gelhard et al. | |
| 3,854,411 A | 12/1974 | Lichtenberg | |
| 3,952,667 A | 4/1976 | Kovanov et al. | |
| 3,954,064 A | 5/1976 | Minovitch | |
| 4,015,540 A | 4/1977 | Roxberry | |
| 4,023,500 A | 5/1977 | Diggs | |
| 4,075,948 A | 2/1978 | Minovitch | |
| 4,108,077 A | 8/1978 | Laing | |
| 4,148,260 A | 4/1979 | Minovitch | |
| 4,175,414 A | 11/1979 | Peytavin | |
| 4,202,272 A | 5/1980 | Teodorescu et al. | |
| 4,400,655 A | 8/1983 | Curtiss et al. | |
| 4,427,740 A | 1/1984 | Stackhouse et al. | |
| 4,603,640 A | 8/1986 | Miller et al. | |
| 4,636,666 A | 1/1987 | Meins | |
| 4,636,667 A | 1/1987 | Holzinger et al. | |
| 4,676,294 A | 6/1987 | Samuelson | |
| 4,718,459 A | 1/1988 | Adorjan | |
| 5,053,654 A | 10/1991 | Augsburger et al. | |
| 5,282,424 A | 2/1994 | O'Neill | |
| 5,388,527 A | 2/1995 | Thornton et al. | |
| 5,619,930 A | 4/1997 | Alimanestiano | |
| 5,712,514 A | 1/1998 | Fischperer et al. | |
| 5,899,635 A | 5/1999 | Kuja et al. | |
| 5,950,543 A * | 9/1999 | Oster | B61B 13/10 |
| | | | 104/130.05 |
| 6,279,485 B1 | 8/2001 | Schlienger | |
| 6,311,476 B1 | 11/2001 | Frye et al. | |
| 6,373,153 B1 | 4/2002 | Hazelton et al. | |
| 6,374,746 B1 | 4/2002 | Fiske | |
| 6,418,857 B1 | 7/2002 | Okano et al. | |
| 6,502,517 B1 | 1/2003 | Groening et al. | |
| 6,510,799 B2 | 1/2003 | Lamb et al. | |
| 6,584,671 B2 | 7/2003 | Miller et al. | |
| 6,684,794 B2 | 2/2004 | Fiske et al. | |
| 6,899,036 B2 | 5/2005 | Lamb et al. | |
| 7,068,991 B2 * | 6/2006 | Parise | B01F 5/0614 |
| | | | 455/343.1 |
| 7,096,794 B2 | 8/2006 | Post | |
| 7,204,192 B2 | 4/2007 | Lamb et al. | |
| 7,478,598 B2 | 1/2009 | Post | |
| 7,835,830 B2 | 11/2010 | Ellmann et al. | |
| 7,841,564 B2 | 11/2010 | Ellmann et al. | |
| 8,006,625 B2 | 8/2011 | Yang | |
| 8,118,266 B2 | 2/2012 | Zheng et al. | |
| 8,171,859 B2 | 5/2012 | Loser et al. | |
| 8,214,957 B2 | 7/2012 | Miettinen | |
| 8,250,990 B2 | 8/2012 | Kunz | |
| 8,281,723 B2 | 10/2012 | Loeser et al. | |
| 8,297,195 B2 | 10/2012 | Loser et al. | |
| 8,402,899 B2 | 3/2013 | Loeser et al. | |
| 8,430,037 B2 | 4/2013 | Miller et al. | |
| 8,430,039 B2 | 4/2013 | Zheng et al. | |
| 8,459,188 B2 | 6/2013 | Miller et al. | |
| 8,468,949 B2 | 6/2013 | Kwon et al. | |
| 8,500,373 B1 | 8/2013 | Epps | |
| 8,534,197 B2 | 9/2013 | Miller | |
| 8,578,860 B2 | 11/2013 | Post | |
| 8,734,139 B2 | 5/2014 | Burns et al. | |
| 8,915,192 B2 | 12/2014 | Zhou | |
| 8,917,086 B2 | 12/2014 | Post | |
| 8,985,030 B2 | 3/2015 | Post | |
| 9,085,304 B2 | 7/2015 | Oster | |
| 9,228,298 B2 | 1/2016 | Oster | |
| 9,290,187 B2 | 3/2016 | Dalrymple | |
| 9,290,278 B2 | 3/2016 | Dillon | |
| 9,302,577 B2 | 4/2016 | Catalan | |
| 9,457,687 B2 | 10/2016 | Brier et al. | |
| 9,764,648 B2 * | 9/2017 | Finodeyev | B60L 11/002 |
| 2001/0037747 A1 | 11/2001 | Svensson | |
| 2002/0197135 A1 | 12/2002 | Arntzen et al. | |
| 2003/0205163 A1 | 11/2003 | Lamb et al. | |
| 2004/0056538 A1 | 3/2004 | Du et al. | |
| 2004/0139723 A1 | 7/2004 | Parkin | |
| 2004/0144096 A1 * | 7/2004 | Wollenweber | F02C 6/06 |
| | | | 60/772 |
| 2004/0155031 A1 | 8/2004 | Toyooka et al. | |
| 2005/0076802 A1 | 4/2005 | Pullium | |
| 2006/0032063 A1 | 2/2006 | Tomasello et al. | |
| 2006/0235589 A1 | 10/2006 | Deng et al. | |
| 2006/0236890 A1 | 10/2006 | Lamb et al. | |
| 2007/0187556 A1 | 8/2007 | Yoshitake | |
| 2007/0192000 A1 | 8/2007 | Ellmann et al. | |
| 2008/0236973 A1 | 10/2008 | Hahn et al. | |
| 2008/0275572 A1 | 11/2008 | Tillotson | |
| 2008/0277534 A1 | 11/2008 | Ellmann et al. | |
| 2009/0101040 A1 | 4/2009 | Yang | |
| 2009/0158955 A1 | 6/2009 | Pulliam | |
| 2010/0005997 A1 | 1/2010 | Tozoni | |
| 2010/0031846 A1 | 2/2010 | Loser et al. | |
| 2010/0092243 A1 | 4/2010 | Bauder | |
| 2010/0115947 A1 | 5/2010 | Galbraith | |
| 2010/0143044 A1 | 6/2010 | Kadaster et al. | |
| 2010/0183407 A1 | 7/2010 | Kim | |
| 2010/0192799 A1 | 8/2010 | Miller | |
| 2011/0226764 A1 | 9/2011 | Smith et al. | |
| 2011/0283914 A1 | 11/2011 | Kwon et al. | |
| 2012/0019235 A1 | 1/2012 | Post | |
| 2012/0089525 A1 | 4/2012 | Kley et al. | |
| 2012/0153744 A1 | 6/2012 | Criswell et al. | |
| 2012/0174901 A1 | 7/2012 | Post | |
| 2012/0285575 A1 | 11/2012 | Catha | |
| 2012/0299684 A1 | 11/2012 | Won | |
| 2013/0174757 A1 | 7/2013 | Post | |
| 2013/0276665 A1 | 10/2013 | Dalrymple | |
| 2014/0000473 A1 | 1/2014 | Miller | |
| 2014/0116406 A1 | 5/2014 | Post | |
| 2014/0261055 A1 | 9/2014 | Oster | |
| 2014/0354064 A1 | 12/2014 | Tseliakhovich | |
| 2016/0009196 A1 | 1/2016 | Allard | |
| 2016/0023668 A1 | 1/2016 | Shetty | |
| 2016/0033970 A1 | 2/2016 | Henderson et al. | |
| 2016/0059868 A1 | 3/2016 | Allaire | |
| 2016/0229297 A1 | 8/2016 | Finodeyev et al. | |
| 2016/0229416 A1 | 8/2016 | Bambrogan et al. | |
| 2016/0229417 A1 | 8/2016 | Bambrogan et al. | |
| 2016/0229418 A1 | 8/2016 | Bambrogan et al. | |
| 2016/0229419 A1 | 8/2016 | Brambrogan et al. | |
| 2016/0229420 A1 | 8/2016 | Coutre et al. | |
| 2016/0229427 A1 | 8/2016 | Avetian et al. | |
| 2016/0229646 A1 | 8/2016 | Bambrogan et al. | |
| 2016/0230350 A1 | 8/2016 | Bambrogan et al. | |
| 2016/0230768 A1 | 8/2016 | Bambrogan et al. | |
| 2016/0230899 A1 | 8/2016 | Cothern et al. | |
| 2016/0230915 A1 | 8/2016 | Cothern et al. | |
| 2016/0233754 A1 | 8/2016 | Dorris et al. | |

(56) References Cited

U.S. PATENT DOCUMENTS

2016/0233809 A1   8/2016   Jetti et al.
2016/0325761 A1   11/2016  Preussmeier

FOREIGN PATENT DOCUMENTS

| WO | WO2003003389  | 1/2003  |
| WO | WO2007087028  | 8/2007  |
| WO | WO2009/135389 | 11/2009 |

OTHER PUBLICATIONS

Wright, I., "Engineering the Hyperloop: Testing 4 Core Elements," dated Feb. 16, 2016.
Protalinski, E., "Hyperloop's intro video claims the future is now," dated Sep. 17, 2015.
GNB Corporation Product Catalog, 20 pages, (Mar. 14, 2013).
Khatait, J., et al., "Design and development of orifice-type aerostatic thrust bearing," SIMTech technical reports, vol. 6, No. 1 (Jan. 2005).
Barsikow, B., et al., "Noise Characteristics of the Transrapid TR08 Maglev System," US Department of Transportation, 338 pages (Jul. 2002).
Brecher, A., et al., "Electromagnetic Field Characteristics of the Transrapid TR08 Maglev System," US Department of Transportation, 224 pages (May 2002).
Chan, L., et al., "Vibration Characteristics of the Transrapid TR08 Maglev System," US Department of Transportation, 143 pages (Mar. 2002).
Todorovich et al., "High-Speed Rail—International Lessons for U.S. Policy Makers," Lincoln Institute of Land Policy, 64 pages (2011).
Peterman, D., et al., "The Development of High Speed Rail in the United States: Issues and Recent Events," Congressional Research Service, 35 pages (Dec. 20, 2013).
International Search Report and Written Opinion of International Searching Authority for related Application No. PCT/US2016/015231, dated Mar. 25, 2016.
International Search Report and Written Opinion of International Searching Authority for related Application No. PCT/US16/15228, dated Apr. 8, 2016.
International Search Report and Written Opinion of International Searching Authority for related Application No. PCT/US16/15215, dated Apr. 8, 2016.
International Search Report and Written Opinion of International Searching Authority for related Application No. PCT/US2016/015234, dated Apr. 4, 2016.
Barboza, D., "A New Port in Shanghai, 20 Miles Out to Sea," The New York Times, Dec. 12, 2005.
International Search Report and Written Opinion of International Searching Authority for related Application No. PCT/US2016/015221, dated Mar. 31, 2016.
International Search Report and Written Opinion of International Searching Authority for related Application No. PCT/US2016/015224, dated Apr. 11, 2016.
International Search Report and Written Opinion of International Searching Authority for related Application No. PCT/US2016/015229, dated Apr. 4, 2016.
Thornton. R., "The Future of Maglev," Magnemotion, Nov. 5, 2007.
International Search Report and Written Opinion of International Searching Authority for related Application No. PCT/US2016/015206, dated Apr. 1, 2016.
International Search Report and Written Opinion of International Searching Authority for related Application No. PCT/US2016/015236, dated Mar. 29, 2016.
International Search Report and Written Opinion of International Searching Authority for related Application No. PCT/US2016/015238, dated Apr. 1, 2016.
International Search Report and Written Opinion of International Searching Authority for related Application No. PCT/US2016/015239, dated Mar. 30, 2016.
Reddy, M., et al., "Microwave Power Transmission—A Next Generation Power Transmission System," IOSR Journal of Electrical and Electronics Engineering, vol. 4, Issue 5, pp. 24-28 (2013).
Garcia, E., "Microwave Energy Transmission for Aircraft," NASA Tech Briefs, 3 pages (Aug. 1, 2010).
Lin, J., "Wireless Power Transmission: From Far-Field to Near-Field," Proceedings of the IEEE, vol. 101, Issue 6, 42 pages (Apr. 4, 2013).

\* cited by examiner

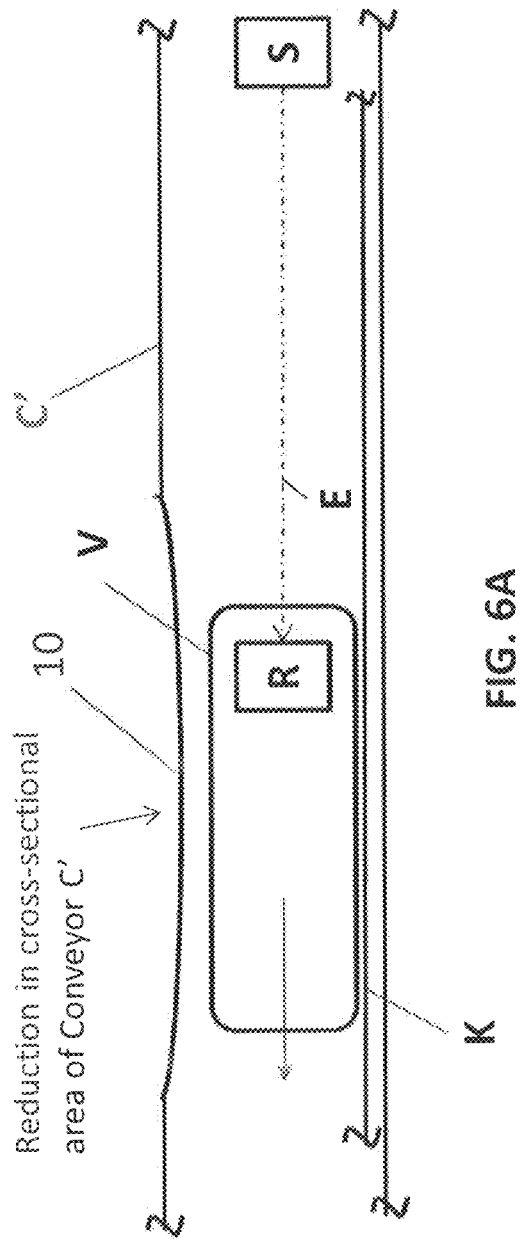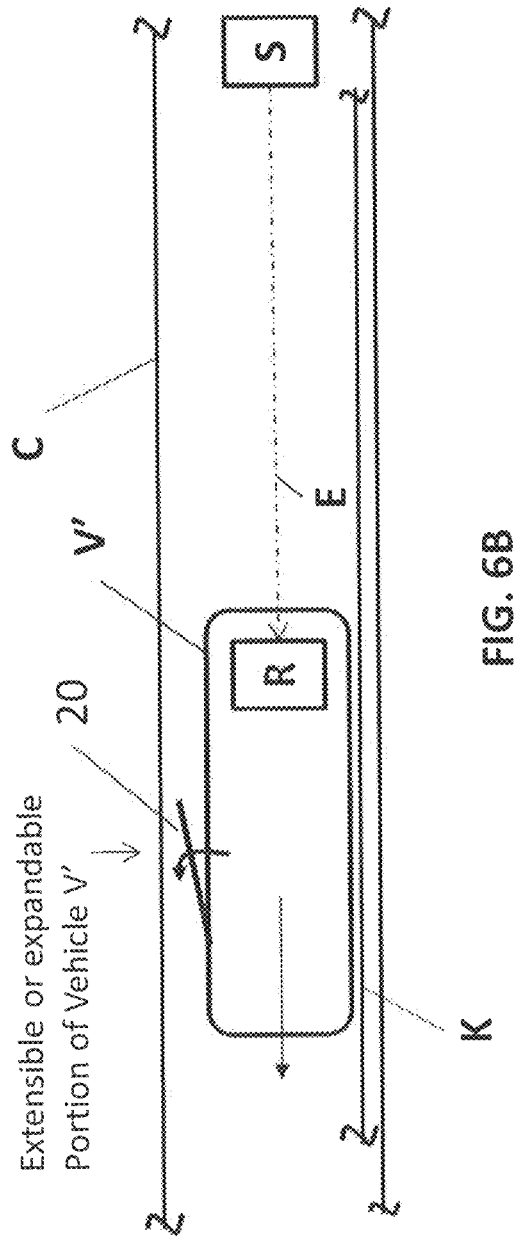

POWER SUPPLY SYSTEM AND METHOD FOR A MOVABLE VEHICLE WITHIN A STRUCTURE

CROSS-REFERENCE TO RELATED APPLICATIONS

The present application is a Continuation of Non-provisional U.S. application Ser. No. 15/007,974 filed Jan. 27, 2016 claiming the benefit of U.S. Provisional Application No. 62/243,903 filed Oct. 20, 2015 and claiming the benefit of U.S. Provisional Application No. 62/113,511 filed Feb. 8, 2015. The disclosures of U.S. application Ser. No. 15/007,974, U.S. Provisional Application No. 62/243,903 and U.S. Provisional Application No. 62/113,511 are expressly incorporated by reference herein in their entireties.

BACKGROUND OF THE INVENTION

1. Field of the Invention

The present invention relates to a power supply system for a transport vehicle. In particular, the power supply system can be used to supply power to running systems such as life support, controls, compressor, and/or propulsion.

2. Discussion of Background Information

Moving vehicles in transportation systems, e.g., railway or bus systems, can use an onboard power supply for running systems such as controls, compressor, and/or propulsion. The power can come from an energy storage device located in or on the vehicle, such as a battery. However, it can be advantageous to use external sources to avoid the mass of any device or system employed to generate or store energy. Such external sources, however, require a transmission method. In practice, vehicles such as buses and trains have utilized external sources to draw power via electric conduction, e.g., via a catenary system or an electrified rail system.

It has also been sought to transmit power in a manner that eliminates the need for transmission of energy via physical contact. One such transmission system has been achieved through inductive coupling. Such systems require a minimalized distance between the transmitter and receiver for maximum efficiency.

Microwave transmission systems have been used in an attempt to transmit power to unmanned aerial vehicles. However, as these attempts have been in the context of open air transmission, these systems suffer from signal dispersion with distance.

Additionally, vehicles with on-board propulsion capability have been sought. Self-propelled vehicles can add flexibility and robustness to a system. This is particularly true for utility vehicles, such as rescue pods, or any vehicle that may need to move inside the system without being strictly constrained by external propulsion sources. Electromagnetic propulsion, which requires a power supply and on-board energy storage in batteries, results in increased vehicle mass. Three-phase electric motors, including induction motors, can be driven by variable frequency drives (VFDs), which accept incoming electrical power, and then output a three-phase alternating current at whatever frequency is necessary to drive the motor. However, such an on-board VFD will also likely be quite heavy and increase the mass of the vehicle.

SUMMARY OF THE EMBODIMENTS

In a high speed, high efficiency transportation system, a low pressure environment can be utilized in order to reduce drag on a vehicle at high operating speeds. In this manner, the transportation system achieves the benefit of allowing a greater potential vehicle speed while lowering energy costs associated with overcoming drag forces. Preferably, these systems use a near vacuum within a tubular structure and the vehicles operating within the tube require an onboard power supply for running systems such as life support, controls, compressor, and/or propulsion. Preferably, the power can come from an energy storage device located in or on the vehicle, such as a battery, or from an external source.

In a high speed scenario, because physical contact between a vehicle transported at a velocity of up to and in excess of 300 m/s and a stationary object may be undesirable because of the associated drag and rapid wear of contact surfaces, it would be advantageous to achieve an external source solution by which onboard power is supplied for running systems such as life support, controls, compressor, and/or propulsion while reducing vehicle weight and avoiding physical contact between the vehicle and the external source.

Embodiments include a microwave source, e.g., a gyrotron, kleistron or magnetron, injecting microwaves into a structure, e.g., a tube, within which a vehicle (or pod) travels. The tube can be configured to act as a waveguide, which keeps the microwave energy from dispersing over distance. The vehicle has a receiver that absorbs the microwaves and converts the energy into electrical current to power onboard systems. The use of the tube as a waveguide maintains power density over tens of kilometers, which makes it practical for powering vehicles over those ranges.

In another embodiment, the vehicle has a system of lenses, waveguides, and mirrors to route impinging microwaves to an absorber. The absorber is made from a substance that absorbs microwaves well and can withstand high temperatures. The absorber converts the energy of the microwaves into heat. The absorber also has air channels in it. A compressor mounted on the vehicle ingests air from the tube, and increases its pressure. The compressor pushes air into the absorber. The absorber heats the incoming air, thus adding energy to it. The absorber routs air into a turbine. The hot pressurized air expands through the turbine, imparting rotational energy to it. The turbine, absorber, and compressor are designed such that the turbine liberates enough energy from the hot air stream to power the compressor via a shaft, other mechanical linkage or an electrical generator. The hot air that exits the turbine has enough energy to impart thrust to the vehicle and compensate for drag. Some of the rotational energy from the turbine can also drive an alternator to provide electrical power for onboard systems.

In another embodiment, the system is designed such that it injects extra air in the path of the vehicle. Thrust that the system can generate increases linearly with air density. Thus, increasing the pressure in the tube to an extent that doubles the air density in the tube, will roughly double the thrust. Drag increases at the square of velocity. Therefore, at low speeds, the thrust to drag ratio can be much higher than at top speed. Maximum thrust is limited by density (pressure) and available thermal power. The system can be configured such that parts of the route where acceleration is required can introduce more microwave power and air into the pipe when a vehicle goes by. As the vehicle enters this acceleration region, it will have both higher thrust to drag ratio and higher maximum thrust than during cruise legs of the route.

Another embodiment provides the ability to brake. If the pod could increase its cross-section area ratio to the tube, by either increasing its cross-section area or the tube shrinking its cross-section area, then a plug of air would be pushed in front of the pod. This will create a high density region in front of the pod. When the pod must accelerate again, the situation will be the same as described in the above paragraph, assuming a sufficient source of microwave power is available. Thus, the pod will convert some of the kinetic energy that it must shed by braking into stored energy in the air.

An embodiment converts microwave power directly into thermal power, thus optimizing transmission efficiency. The thermal absorbers in accordance with embodiments can achieve, e.g., 1,000 kW/m$^2$, which is substantially higher than other devices conventionally used with microwave power transmission. This means that less vehicle surface area is needed to receive power, or more power can be ultimately transmitted to each vehicle. However, as a thermal cycle is run, all related heat rejection takes place at very high temperatures, in the form of the exhaust, with no radiators needed.

Air injection and compression give vehicles the ability to accelerate and decelerate without linear induction motors. This can reduce the number of propulsion stations (linear induction motors) needed to operate a system, with great potential cost savings. This embodiment would displace a burden from costly linear induction motors onto cheaper vacuum pumps.

Another embodiment includes a vehicle that contains a plurality of rectennae and a linear induction motor. On the track side, there is at least one microwave power transmission station. The microwave power transmitters operate in different frequencies, and the rectennae are substantially tuned to those frequencies. Thus, with a plurality of operating frequencies and a plurality of rectennae tuned to those frequencies, modulating the power output on the frequencies will result in a plurality of independent phases of current on the vehicle. Rectennae are lighter than a conventionally used variable frequency drive and thus represent a substantial mass reduction for a pod with onboard propulsion.

Moreover, this embodiment allows a vehicle to change its velocity at any point in the route. The vehicle-side propulsion system can also act as a supplement to a corresponding track-side propulsion system, and work together to allow the vehicle to independently control acceleration, including coming to a complete stop and then accelerating again in any part of the system, which is impossible for an equivalent stationary track-side system. Given the greater than linear scaling of track-side propulsion, it may be more economical to have some limited thrust capability on the vehicle.

In embodiments, the receiver can include a heat exchanger. The heat exchanger and the absorber can be built into one single device or two separate and distinct devices. In further embodiments, the vehicle or pod can include a ramjet engine with inlet and exit nozzles. The absorber and/or heat exchanger can be placed between the inlet and exit nozzles of the ramjet engine. Moreover, the inlet and exit nozzles can be of converging type, diverging type, or any converging-diverging combination. The inlet and outlet nozzles can also be of variable geometry. The inlet can provide compressed air to the absorber/heat exchanger, the absorber/heat exchanger can increase the temperature of the air, and the exit nozzle can expand the air at high pressure and/or high velocity.

In accordance with embodiments, the absorber and heat exchanger can perform a function similar to a combustion chamber commonly found on turbojet and ramjet engines. As such, the compressed air may be fed into the absorber/heat exchanger using either a compressor, a ramjet inlet nozzle or a combination of the two. The absorber/heat exchanger increases the temperature of the air before it is expanded through a turbine, a ramjet exit nozzle, or a combination of the two. In embodiments, the absorber/heat exchanger can fully replace a combustion chamber and remove the need for the combustion of hydrocarbon fuel altogether. In another embodiment, the absorber/heat exchanger can work in conjunction with a conventional combustion chamber.

In other embodiments, the absorber may rely on an ionized gas to absorb microwave energy and turn it into heat. A laser, or a very high potential field will ionize incoming gas within the confines of the absorber. Ionized gas, or plasma, absorbs electromagnetic waves. Microwaves directed into the absorber will add energy to the ionized gas, thus transferring heat directly to the gas instead of via an intermediary material.

Embodiments are directed to a system for converting transmitted energy to vehicle movement. The system includes a structure having an elongated tubular interior; a movable vehicle structured and arranged to move through the elongated tubular interior; at least one energy source arranged at a fixed location within the elongated tubular interior to transmit energy; and a receiver, carried by the movable vehicle, being configured to receive the transmitted energy from the at least one energy source and to convert the received energy into at least one of electrical power and thrust for moving the vehicle.

In embodiments, the at least one source can include a microwave energy source. Further, the elongated tubular interior can be configured to act a waveguide to guide microwave energy transmitted from the microwave source to the at least one receiver.

According to embodiments, the system may further include at least one vacuum source coupled to the elongated tubular structure to maintain the elongated tubular structure at a near vacuum pressure.

In accordance with other embodiments, the at least one energy source may include a plurality of energy sources distributed along a length of the elongated tubular structure.

In other embodiments, the elongated tubular structure can include at least one section having a reduced diameter, whereby, as the vehicle moves into the at least one reduced diameter section, forward motion of the vehicle is impeded.

Moreover, in embodiments, the vehicle can include at least one exterior section being outwardly extensible, whereby, as the at least one section is extended outwardly, forward motion of the vehicle is impeded.

According to still other embodiments, the receiver may include a heat exchanger. Further, the heat exchanger can include an absorber configured to absorb the received energy to generate heat. The absorber may include a plurality of air channels and the receiver can further include a compressor configured for supplying pressurized air into the air channels and a turbine for receiving heated pressurized air from the absorber, which imparts rotational energy to the turbine. The can be configured to at least one of rotate the compressor and generate electricity. The at least some of the heated pressurized air can escape from the turbine to impart thrust to the vehicle. Further, the compressor can be structured to receive air from outside of the vehicle. In embodiments, a bypass fan can be included for supplying air into the compressor. Still further, fluid supply may be coupled to supply a fluid to the absorber. The fluid in the fluid supply can be one of nitrogen or air. The system may also include a fluid supply, structured and arranged to selectively supply a fluid under pressure into the air channels. Moreover, microwave lenses and an internal waveguide can be coupled to the vehicle to receive and guide the energy transmitted from the energy source to the absorber. Further still, a ramjet engine may be coupled to the vehicle. The ramjet engine can have inlet and outlet nozzles configured as converging type, diverging type or any converging-diverging combination of nozzles. The heat exchanger may be positioned between the inlet and exit nozzles.

In accordance with other embodiments, the vehicle can include a dielectric shell located on at least one end of the vehicle. The dielectric shell may be structured to be invisible to the energy transmitted from the energy source.

Further, the receiver may include a plurality of rectennae configured to receive the energy transmitted from the energy source and to convert the received energy into electrical power.

According to other embodiments, the movable vehicle can be a capsule or pod.

Embodiments of the invention are directed to a power conversion system movable within a waveguide. The system includes an energy source arranged at a fixed location within the waveguide to transmit energy within the structure; and at least one receiver, which is configured for movement through the waveguide, being structured to convert the transmitted energy to at least one of electrical power and thrust for movement of the at least one receiver.

According to embodiments, the energy source can be a microwave source.

In accordance with still yet other embodiments of the present invention, the at least one receiver may include a heat exchanger. The heat exchanger can include an absorber configured to absorb the received energy to generate heat. Further, the absorber may include a plurality of air channels and the at least one receiver may further include a compressor configured for supplying pressurized air into the air channels and a turbine for receiving heated pressurized air from the absorber, which imparts rotational energy to the turbine. The turbine may be configured to at least one of rotate the compressor and generate electricity. Further, at least some of the heated pressurized air can escape from the turbine to impart thrust to the at least one receiver. The compressor can be structured to receive air from outside of the at least one receiver. Further, a bypass fan can be provided for supplying air into the compressor.

Embodiments are directed to a power supply system for a vehicle movable within a structure. The power supply system includes at least one energy source arranged at a fixed location within the structure to transmit energy within the structure, and a receiver, arranged on the vehicle to receive the energy transmitted from the energy source, being configured to convert the energy to at least one of electrical power and thrust.

In accordance with other embodiments, an interior of the structure can be structured to act as a waveguide.

According to other embodiments, the energy source may be a microwave source.

According to still other embodiments, the receiver can include a heat exchanger. The heat exchanger may include an absorber configured to absorb the received energy to generate heat. Further, the absorber can include a plurality of air channels and the receiver may further include a compressor configured for supplying pressurized air into the air channels and a turbine configured for receiving heated pressurized air from the absorber, which imparts rotational energy to the turbine. The turbine may be configured to at least one of rotate the compressor and generate electricity. At least some of the heated pressurized air can escape from the turbine to impart thrust to the vehicle. The compressor can be structured to receive air from outside of the vehicle.

The power supply system can also include a bypass fan for supplying air into the compressor. A fluid supply may be coupled to supply a fluid to the absorber, and the fluid in the fluid supply can be one of nitrogen or air.

In embodiments, the power supply system can further include a ramjet engine having inlet and outlet nozzles configured as converging type, diverging type or any converging-diverging combination of nozzles. The absorber can be positioned between the inlet and exit nozzles.

In still other embodiments, microwave lenses and an internal waveguide are arranged to receive and guide the energy transmitted from the energy source from an end of the vehicle to the absorber. Further, the vehicle may include a dielectric shell located on at least one end of the vehicle, the dielectric shell being structured to be invisible to the energy transmitted from the energy source.

According to further embodiments, the receiver can include a plurality of rectennae structured and arranged to receive the energy transmitted from the energy source and to convert the received energy into electrical power.

In accordance with still other embodiments, the structure may include a tubular structure maintained at a near vacuum pressure and a track over or on which the vehicle moves. The at least one energy source may include a plurality of energy sources arranged along a length of the tubular structure.

In still other embodiments, the tubular structure may include at least one section having a reduced diameter, whereby, as the vehicle moves into the at least one reduced diameter section, a plug of air is created in front of the vehicle to impede forward motion of the vehicle.

According to other embodiments, the vehicle can include at least one section having an increasable exterior height, whereby, as the exterior height of the at least one section is increased, a plug of air is created in front of the vehicle to impede forward motion of the vehicle.

In accordance with further embodiments, a fluid supply is structured and arranged to selectively supply a fluid under pressure into the air channels.

In accordance with still other embodiments, the movable vehicle can be a capsule or a pod.

Embodiments are directed to a method of supplying power to a vehicle movable within a structure. The method includes transmitting energy within the structure from a location fixed within the structure; receiving the transmitted energy in the movable vehicle; and converting the received energy into at least one of electrical power and thrust.

In embodiments, an interior of the structure includes a waveguide.

According to other embodiments, the energy may be transmitted within the structure as microwave energy.

In accordance with still other embodiments, the received energy may be converted into heat by an absorber. The absorber can include a plurality of air channels and the method can further include pressurizing air from outside of the vehicle; supplying the pressurized air into the air channels; and transmitting the heated pressurized air to impart rotational energy to a turbine. The turbine rotates the compressor and/or generates electricity. At least some of the heated pressurized air can escape from the turbine to impart thrust to the vehicle. The air from outside of the vehicle that is pressurized can be forced into the receiver by a bypass fan. The method can also include supplying a fluid into the absorber, where the fluid may be one of nitrogen or air.

In still other embodiments, the absorber may be positioned between an inlet nozzle of a ramjet, which performs mostly compression and an exit nozzle of the ramjet, which performs mostly expansion.

According to further embodiments, the method can also include receiving and guiding the energy transmitted from the energy source from an end of the vehicle to the absorber. Further, the vehicle may include comprises a dielectric shell located on at least one end of the vehicle, the dielectric shell being structured to be invisible to the energy transmitted from the energy source.

In embodiments, the energy transmitted from the energy source can be converted directly into electrical power.

According to further embodiments, the structure may include a tubular structure maintained at a near vacuum pressure and a track over or on which the vehicle moves. The at least one energy source can include a plurality of energy sources arranged along a length of the tubular structure. Further, the tubular structure may include at least one section having a reduced diameter, whereby, as the vehicle moves into the at least one reduced diameter section, a plug of air is created in front of the vehicle to impede forward motion of the vehicle.

In accordance with still other embodiments, the vehicle can include at least one section having an increaseable diameter, and the method further may further include increasing the diameter of the at least one section to create a plug of air in front of the vehicle to impede forward motion of the vehicle.

In accordance with still yet other embodiments of the invention, the method can further include supplying a fluid into the structure to at least in part be pressurized and supplied into the air channels.

Embodiments are directed to a system for conveying a vehicle powered via microwave energy. The system includes an elongated tubular structure having a track; a movable vehicle structured and arranged to move at least one of over and on the track; a plurality of microwave sources arranged at fixed locations within and along the elongated structure to supply microwave energy within the structure; and a receiver, carried by the movable vehicle, being configured to receive the microwave energy from at least one of the plurality of microwave sources and to convert the received microwave energy into at least one of electrical power and thrust.

Other exemplary embodiments and advantages of the present invention may be ascertained by reviewing the present disclosure and the accompanying drawing.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example, it is to be expressly understood, however, that the drawings are for the purpose of illustration and description only, and they are not intended as a definition of the limits of the system. For a more complete understanding of the disclosure, as well as other aims and farther features thereof, reference may be had to the following detailed description of the disclosure in conjunction with the following exemplary and non-limiting drawings wherein:

FIGS. 6A 6C illustrate embodiments for effecting a braking or slowing of the movable vehicle;

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
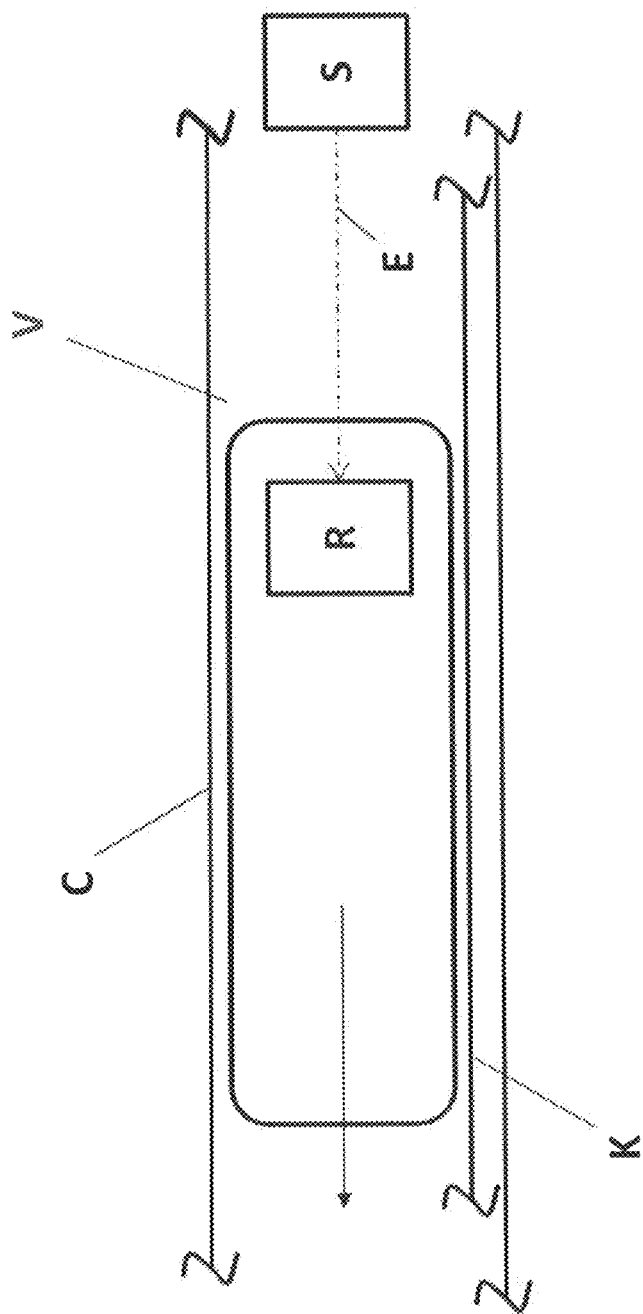
FIG. 1 illustrates a simplified view of a movable vehicle receiving energy from a fixed source.

An embodiment of a power supply system and method for a movable vehicle for pod or capsule) V is illustrated in FIG. 1 and includes at least one source S, which may be located at a fixed position along and/or within a tube or conveyor C, only a portion of which is illustrated, that transmits energy E to a vehicle V movable over or on a track K (only a portion of which is illustrated) within conveyor C. Conveyor C can be a closed structure, which closed structure can be configured as a tube. In a non-limiting exemplary embodiment, the tube can be maintained at a low pressure, such as a near vacuum pressure having a target pressure of about 100 Pa Vehicle V can have or be a receiver R that receives the energy transmitted from source S and converts the received energy into power for vehicle V. Receiver R can, e.g., generate dc electrical current to power onboard systems and impart thrust to drive vehicle V over or on track K through conveyor C. Examples of such a transportation system for the claimed embodiments are disclosed in commonly assigned U.S. application Ser. No. 15/007,783, entitled "Transportation System," filed on even date herewith, the entire contents of which are hereby expressly incorporated by reference herein.

Figure 2:
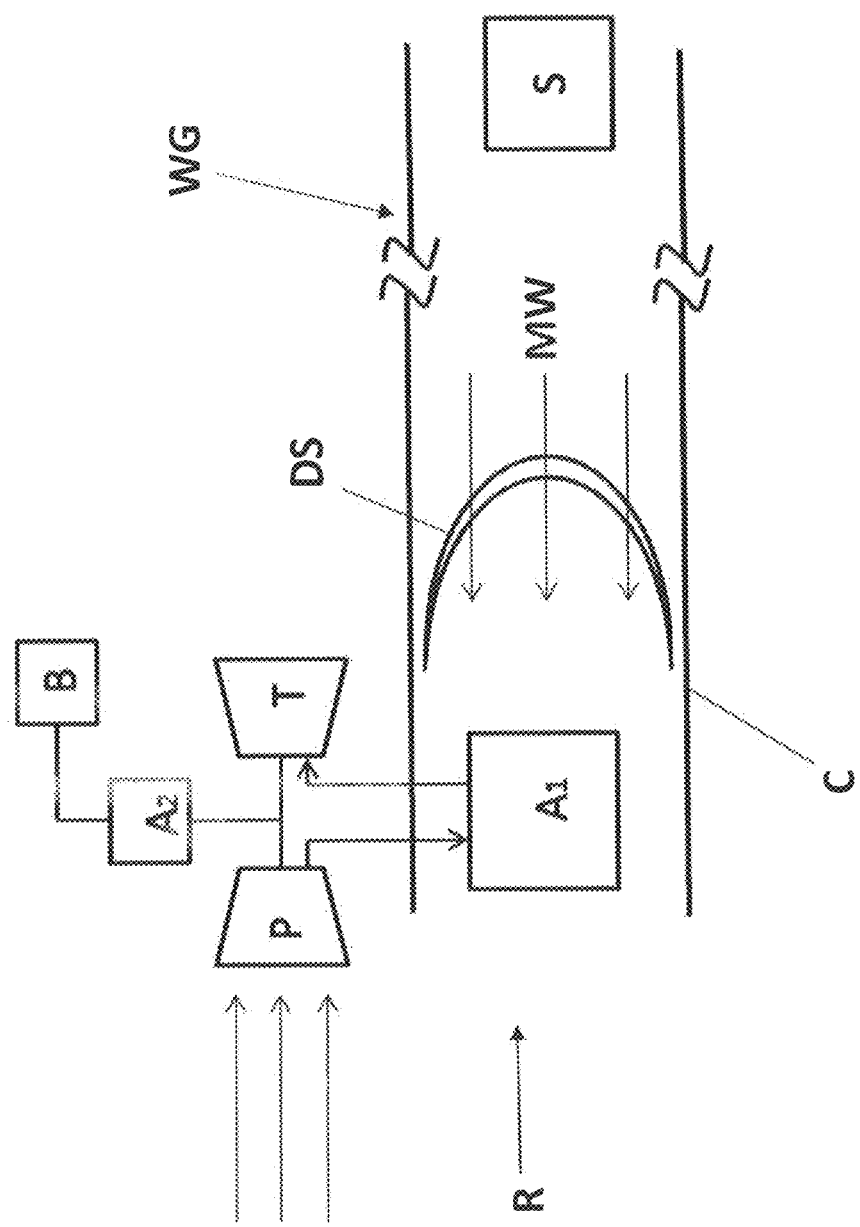
FIG. 2 illustrates an embodiment of the power supply system for a movable vehicle using microwaves.

In accordance with embodiments, FIG. 2 illustrates, by way of non-limiting example, source S as a microwave energy source, e.g., a gyrotron, kleistron or magnetron, that is arranged to inject micro gave energy MW into conveyor C. Conveyor C can be configured, e.g., as a closed and/or tubular structure, to act as a microwave waveguide WG so that microwave energy MW supplied from source S is prevented from dispersing over distance. Moreover, by forming conveyor C waveguide WG, a power density of microwave energy MW can be maintained over tens of kilometers, so that powering of vehicle V over such a range is practical. The walls of conveyor C, e.g., can be structured of copper, steel or other suitable conductive material and/or can have a lining, coating, grid or mesh of copper, steel or other suitable conductive material overlaid on or applied to a wall structure of conveyor C, whereby conveyor C is suitably structured to act as a microwave waveguide WG to transmit the microwaves supplied from source S through conveyor C to vehicle V. By way of example, the range of microwave energy supplied by source S can be between 900 MHz and 100 GHz, depending upon the specifications of the source.

While only a single source S is shown in the exemplary embodiment, it is to be understood that a number of sources S can be arranged along track K to transmit energy E to vehicle V as it traverses over or on track K of conveyor C. Sources S can be spaced along track K at distances between every several meters to every several kilometers, depending upon the power of source S. By way of non-limiting example, for smaller sources S having power corresponding to a conventional microwave oven, sources S can be spaced every few meters, while more powerful sources S, such as gyrotrons, can be spaced every several kilometers. Distances between sources are preferably set to ensure that adequate microwave energy is received by vehicle V. By way of non-limiting example, a vehicle or pod receiving energy from, e.g., 250 kW microwave sources spaced every 10 km over 50 km would receive over 2 MW of power.

In the exemplary embodiment illustrated in FIG. 2, microwave energy MW transmitted through waveguide WG of conveyor C, which can be, e.g., about 7 m in diameter, are received or absorbed by receiver R, which is located on vehicle V, which can be, e.g., about 3 m in diameter. Microwave energy MW transmitted through waveguide WG passes through dielectric shell DS, which can be a panel located on vehicle V or can be an outer portion or structure at a front and/or rear of vehicle V. Moreover, dielectric shell DS, which is structured to be invisible to microwaves, can be made of fiberglass or plastic, and can also be aerodynamically designed so as not to increase drag.

Behind dielectric shell DS an absorber $A_1$ can be arranged to receive the microwave energy MW passing through dielectric shell DS. Absorber $A_1$, which is structured to operate as a heat exchanger, can be made from a material that absorbs microwaves and can withstand high temperatures. Further, it is understood that in the foregoing embodiments, a heat exchanger and the absorber $A_1$ can be built into one single device or as two separate and distinct devices. By way of example, absorber $A_1$ can be made to include a material, e.g., ceramic, that absorbs the impinging microwave energy to generate heat. Further, the specific material can preferably be selected so that absorber $A_1$ is tuned to the frequency of the microwave energy supplied by source S. Absorber $A_1$ can be coupled to a compressor P mounted in or on vehicle V, e.g., at a front of vehicle V. Compressor P is structured and arranged to draw in or ingest air (depicted as arrows) from conveyor C, increase the pressure of the ingested air and push the pressurized air into absorber $A_1$. By way of non-limiting example, absorber $A_1$ can be formed with air channels (not shown) to receive the pressurized air from compressor P and these air channels can be sized to optimize in a known manner for maximum surface area of contact between the air and the absorber material. In this way, as absorber $A_1$ converts microwave energy MW into heat, the pressurized air in the air channels is heated, thereby adding energy to it. Further, absorber $A_1$ is also coupled to a turbine T so that the heated pressurized air in absorber $A_1$ is routed into turbine T. In operation, the hot pressurized air expands through turbine T, which imparts rotational energy to turbine T.

Turbine T, absorber $A_1$, and compressor P are designed and arranged so that turbine T liberates enough energy from the hot pressurized air stream to power compressor P via a mechanical linkage, such as a shaft, and/or to power an electrical generator. Some of the rotational energy from turbine T can drive an alternator $A_2$ to provide electrical power for onboard systems, e.g., via a buffer battery B. Moreover, the hot air exiting turbine T can have enough energy to impart sufficient thrust to vehicle V to compensate for drag.

The exemplary embodiment converts microwave power directly into thermal power, which optimizes transmission efficiency. By way of example, thermal absorbers $A_1$ can achieve, e.g., 1,000 $kW/m^2$, which is substantially higher than other conventional devices used with microwave power transmission. For example, thermal absorber A1 have 10 times the energy density of rectennae, which convert microwaves into DC current. Accordingly, less vehicle surface area is needed to receive power and/or more power can be transmitted to vehicle V. Further, with this embodiment, a thermal cycle is run in which all related heat rejection takes place at very high temperatures in the form of the exhaust through turbine T. As no radiators are required to remove heat, the weight of vehicle V can be reduced.

Figure 3:
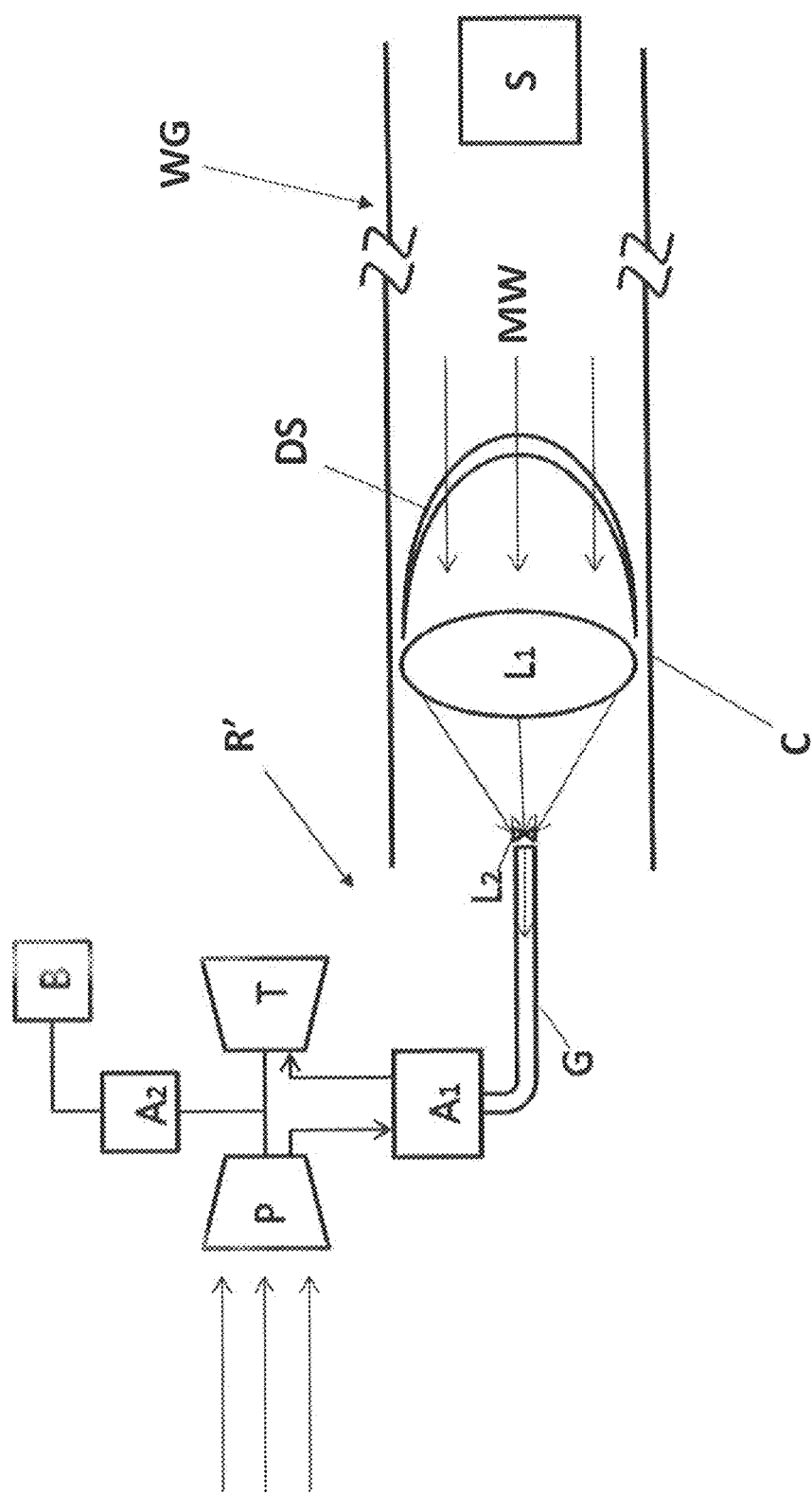
FIG. 3 illustrates a variant of the embodiment of the power supply system for a movable vehicle using microwaves depicted in FIG. 2 that uses an alternative receiver.

As it may not be practicable to locate absorber $A_1$ at an end of vehicle V to receive the transmitted microwave energy, FIG. 3 illustrates a variant of receiver R in the embodiment depicted in FIG. 2. In this exemplary embodiment, receiver R' includes lenses and/or mirrors that can be utilized to concentrate the received microwave energy MW and guide the microwave energy through an internal waveguide G. In a non-limiting example, microwave energy MW passing through dielectric shell DS can be concentrated by a microwave lens $L_1$ to a microwave lens $L_2$, which focusses microwave energy MW into microwave waveguide G. The lenses $L_1$ and $L_2$ and internal waveguide G can be constructed and operated in a manner similar to a microwave endoscope, internal waveguide G can be, e.g., structured of copper, steel or other suitable conductive material, and lenses $L_1$ and $L_2$ can be formed from, e.g., a polymer material and/or a foam material, in order to supply the microwave energy MW into internal waveguide G. Through use of internal waveguide G, absorber $A_1$ can be arranged in a convenient location in vehicle V, and internal waveguide C can be arranged to guide microwave energy MW to aborter $A_1$. Otherwise, absorber $A_1$, compressor P and turbine T, as well as alternator $A_2$ and battery B, are structured and operated in the manner discussed above in the embodiment of FIG. 2.

Figure 4:
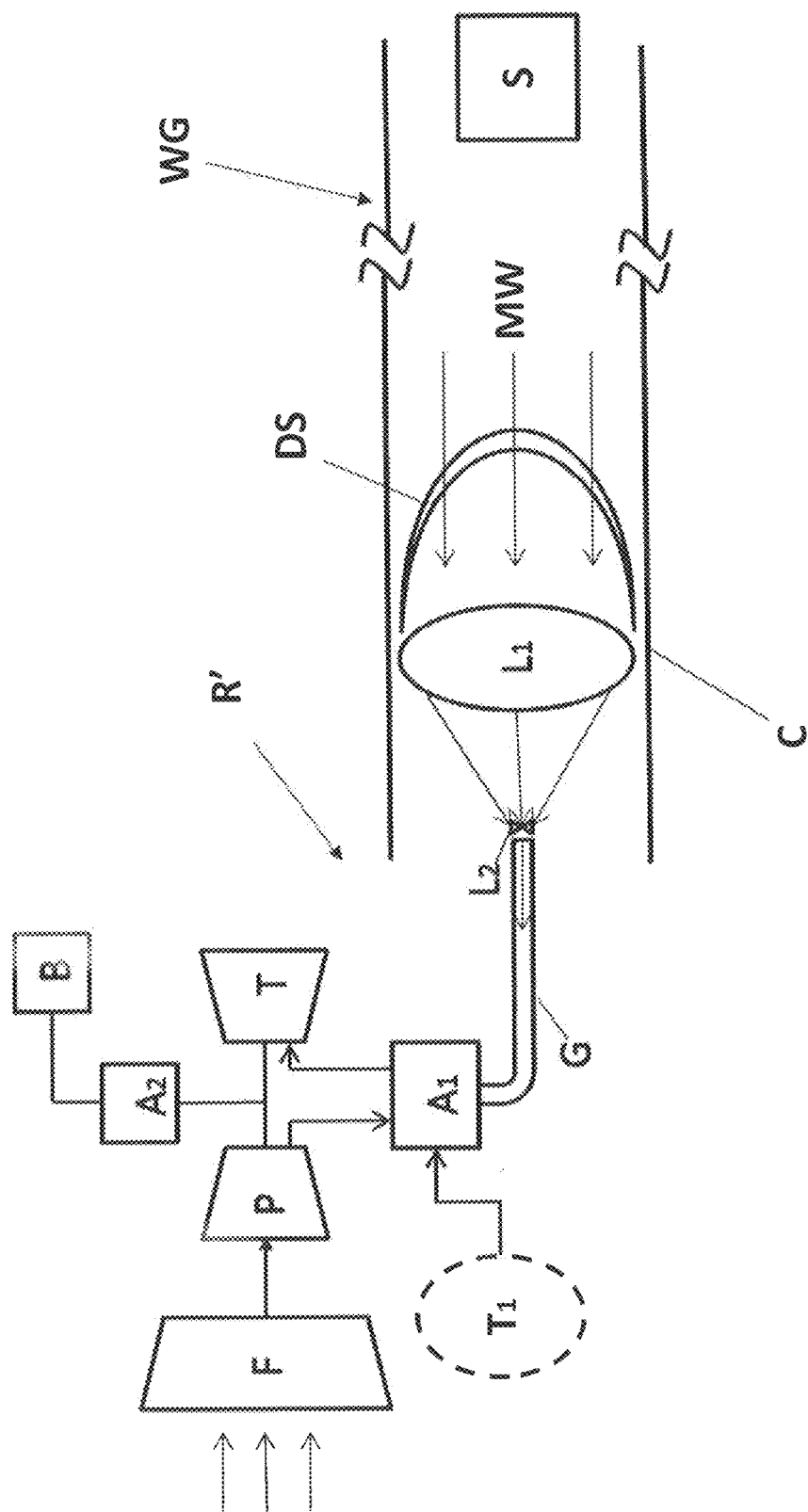
FIG. 4 illustrates a variant of the embodiment of the power supply system for a movable vehicle using microwaves depicted in FIG. 3 that uses a bypass fan and/or a fluid supply.
Figure 5:
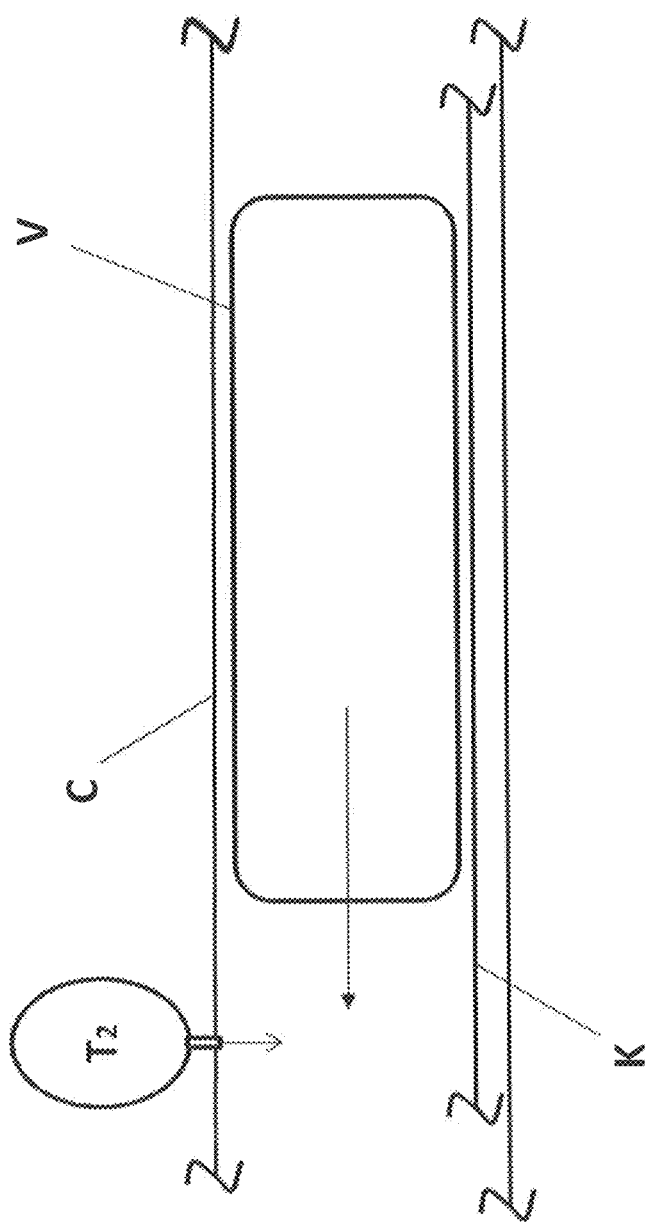
FIG. 5 illustrates an embodiment for imparting additional thrust on the vehicle by supplying additional fluid to the power supply system for a movable vehicle.

In a variant of the embodiment shown in FIG. 3, a forced supply of air can be used to increase thrust. As illustrated in FIG. 4, a bypass fan 4 arranged in front of compressor P like a turbo fan engine. In this regard, bypass fan 4 includes a plurality of rotating blades to draw in air and three the air into compressor P, whereby more pressurized air is heated in absorber $A_1$ and more heated air is expelled through turbine T. Consequently, thrust is increased. Alternatively or additionally, a supply of liquid nitrogen or compressed air $T_1$ can be utilized and directly injected into absorber $A_1$, which will likewise increase the heat expelled by turbine T to increase thrust. It is further contemplated that bypass fan F and/or the injected supply of liquid nitrogen or compressed air $T_1$ can be utilized with receiver R in FIG. 2, where microwave energy MW, through dielectric shell DS, directly impinges on absorber $A_1$.

In a variation applicable to the previously described embodiments of FIGS. 2-4, FIG. 5 illustrates an embodiment in which extra air is injected from a supply $T_2$ in the path of the vehicle to increase the pressure in front of vehicle V. This can be advantageous in that the thrust that can be generated increases linearly with air density in conveyor C. Thus, increasing the pressure in the tube, to an extent that doubles the air density in the tube, will roughly double the thrust. Drag increases at the square of velocity. Therefore, at low speeds, the thrust to drag ratio can be much higher than at top speed. Maximum thrust is limited by density (pressure) and available thermal power. However, because it is intended to operate vehicle V in a near vacuum within conveyor C, any additional air supplied via supply $T_2$ will need to be removed by the system's vacuum pumps (not shown) to maintain the target pressure within conveyor C. At designated portions of the route at which acceleration is required, it can be particularly advantageous to introduce increased microwave power and air into the pipe when a vehicle goes by. Consequently, as it enters the designated acceleration region, vehicle V will have both a higher thrust to drag ratio and a higher maximum thrust than during cruise legs of the route.

Figure 6C:
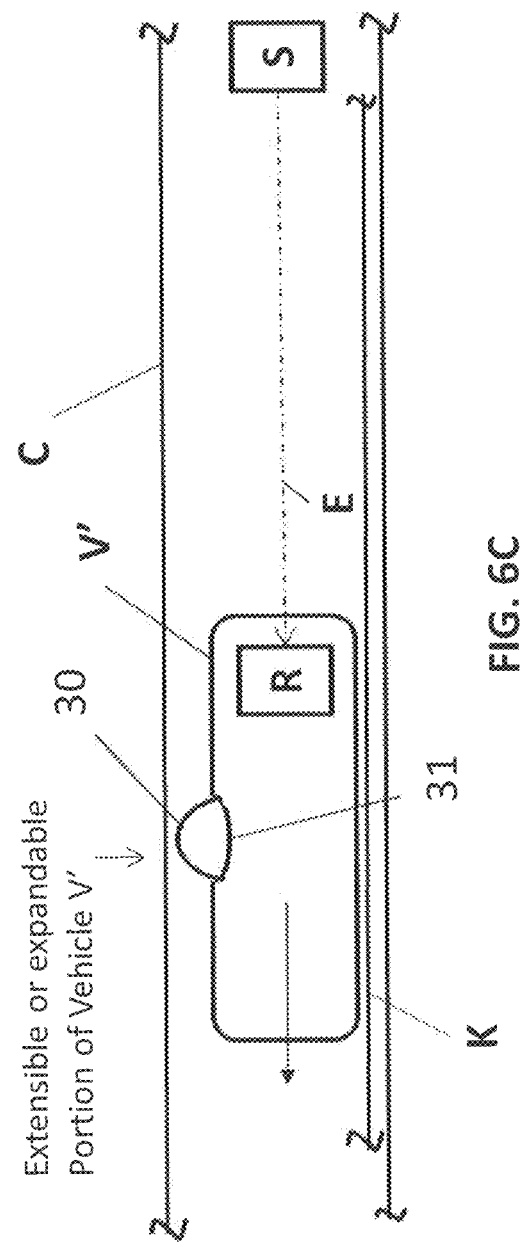

Other embodiments contemplate braking of vehicle V as it traverses over or on track K. These exemplary embodiments, as shown in FIGS. 6A, 68 and 6C, utilize a plug of air created by relative reductions in the difference between the diameter of conveyor C and the diameter of vehicle V to push against the front of vehicle V. In the exemplary embodiment of FIG. 6A, a gradual shrinking or reduction in a portion 10 of the cross-sectional area of conveyor C", e.g., when approaching a station, a sharp curve or an interchange, would create the plug of air in front of vehicle V as it approaches the cross-sectionally reduced area 10 of conveyor C'. In the exemplary embodiment of FIG. 6B, vehicle V' can include at least one extensible or expandable portion 20 that will change the effective diameter of vehicle V' passing through conveyor C, e.g., when approaching a station, a Sharp curve or an interchange. This at least one extensible or expandable portion 20 can be operated, e.g., as an air brake on an airplane wing, and can be hydraulically, pneumatically or electrically actuated and/or can include an inflatable bladder that can be arranged to actuate the at least one extensible or expandable portion. In the exemplary embodiment of FIG. 6C, the at least one extensible or expandable portion can be an inflatable bladder 30 arranged on the exterior vehicle V' or in a recess 31 formed in the exterior of vehicle V' so that inflatable bladder 30 extends crosswise to the direction of travel. As inflatable bladder 30 is inflated, a height of bladder 30 increases the exterior height or diameter of vehicle V', whereby a plug of air is created in front of vehicle V'. Moreover, it should be understood that the embodiments of FIGS. 6A, 6B and 6C can be used together. These embodiments of FIGS. 6A, 6B and/or 6C can be implemented to create a high density region in front of vehicle V or V'. Further, following a braking procedure, if the vehicle or pod wants to accelerate again, the system can advantageously utilize the embodiment described in FIG. 5, assuming a sufficient source of microwave power is available. In this way, vehicle V or V' will convert some of the kinetic energy that it shed by braking into stored energy in the air. It is further contemplated that, after the braking procedure, vehicle V or V' can also advantageously utilize the embodiments of FIGS. 2-4.

Propulsion stations, which can include, e.g., linear motors, can also be arranged along conveyor C in order to impart a general motive force onto vehicle V or V', in particular at locations along conveyor C at which a change of velocity of vehicle V is desired. However, the air injection embodiment of FIG. 5 and the air compression embodiments of FIGS. 6A and 6B give vehicles V or V' the ability to accelerate and decelerate while traversing track K without the use of such linear motors. Advantageously, the number of propulsion stations needed to operate a system can be reduced, which results in potentially great cost savings. Further, by implementing these embodiments of FIGS. 5, 6A and 6B, the burden from costly linear motors would be displaced onto cheaper vacuum pumps, which simply need to remove the air and heat added to conveyor C.

Figure 7:
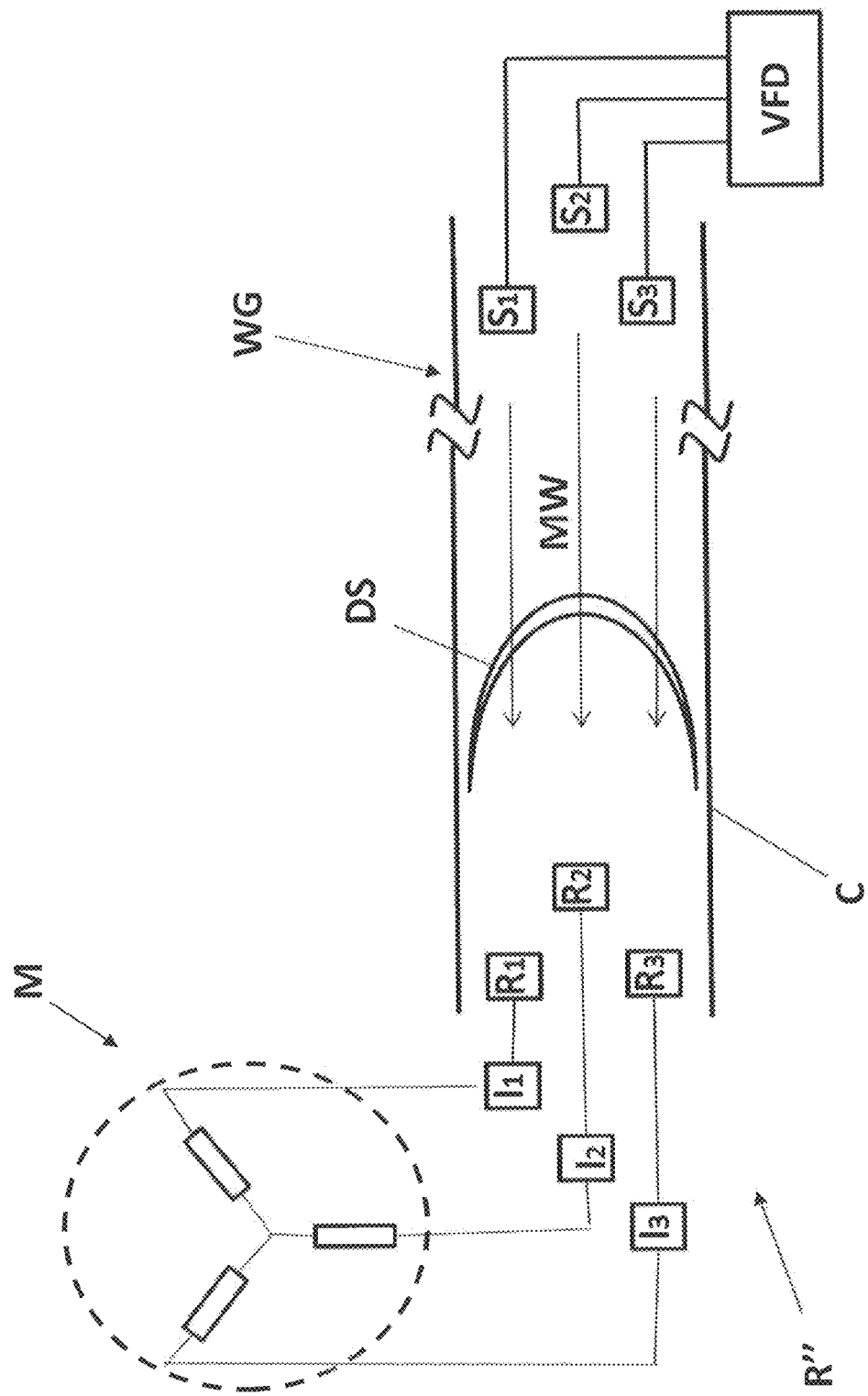
FIG. 7 illustrates a variant of the embodiment of the power supply system for a movable vehicle using microwaves depicted in FIG. 2 that uses a receiver with rectennae.
Figure 8:
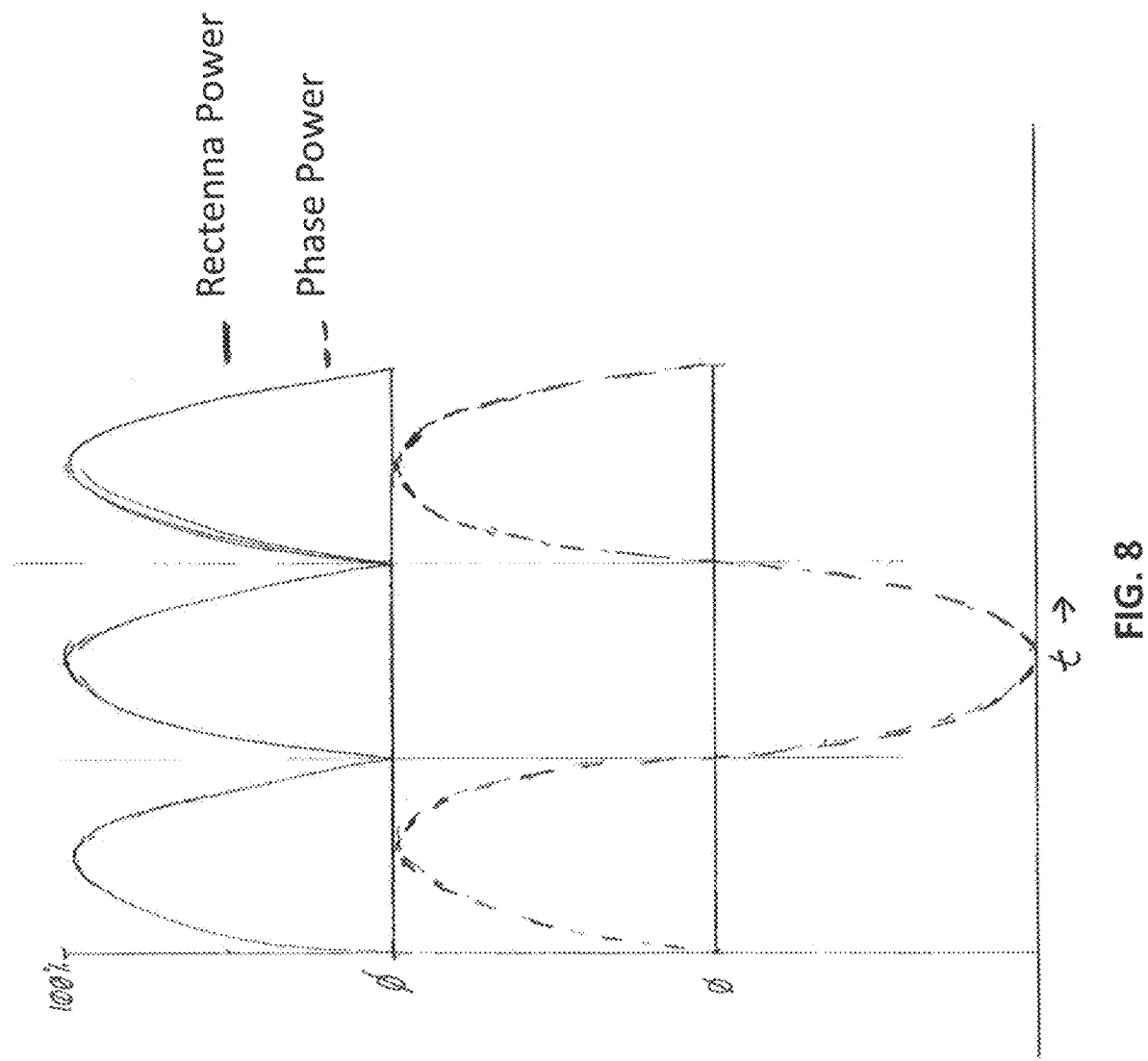
FIG. 8 graphically illustrates rectenna power and phase power for the embodiment depicted in FIG. 7.

In another embodiment illustrated in FIG. 7, a variable frequency, drive (VFD), e.g., a three phase VFD, is configured to drive a number of sources, e.g., microwave emitters, $S_1$, $S_2$ and $S_3$. The VFD can have any number of phases, and each of the sources are configured to operate at different frequencies, e.g., 2.5 GHz, 5 GHz, and 7 GHz in the exemplary embodiment. A receiver R" mounted in the vehicle or pod includes rectennae $R_1$, $R_2$ and $R_3$, which are coupled to a linear motor M via respective inverters $I_1$, $I_2$ and $I_3$. The energy transmitted from sources $S_1$, $S_2$ and $S_3$ travel along waveguide G to rectennae $R_1$, $R_2$ and $R_3$. Each rectenna $R_2$, $R_3$ is tuned to absorb energy transmitted at the frequency corresponding to its phase. A rectenna power profile is illustrated in FIG. 8. Further, as rectennae $R_1$, $R_2$, $R_3$ supply power to the linear motor M via inverters $I_1$, $I_2$ and $I_3$, the inverters change the direction of phase current as appropriate, see FIG. 8.

With a plurality of operating frequencies and a plurality of rectennae tuned to those frequencies, modulating the power output on the frequencies will result in a plurality of independent phases of current on the vehicle. Moreover, as rectennae are lighter than conventionally used variable frequency drives (VFD), this embodiment represents a substantial mass reduction for a vehicle or pod with onboard propulsion.

Moreover, this exemplary embodiment allows a vehicle to change its velocity at any point in the route. The vehicle-side propulsion system can act as a supplement to a corresponding track-side propulsion system and can work together with a corresponding track-side propulsion system to allow the vehicle to independently control acceleration, including coming to a complete stop and then accelerating again in any part of the system. Given the greater than linear scaling of track-side propulsion, it may be more economical to have some limited thrust capability on the vehicle.

Figure 9:
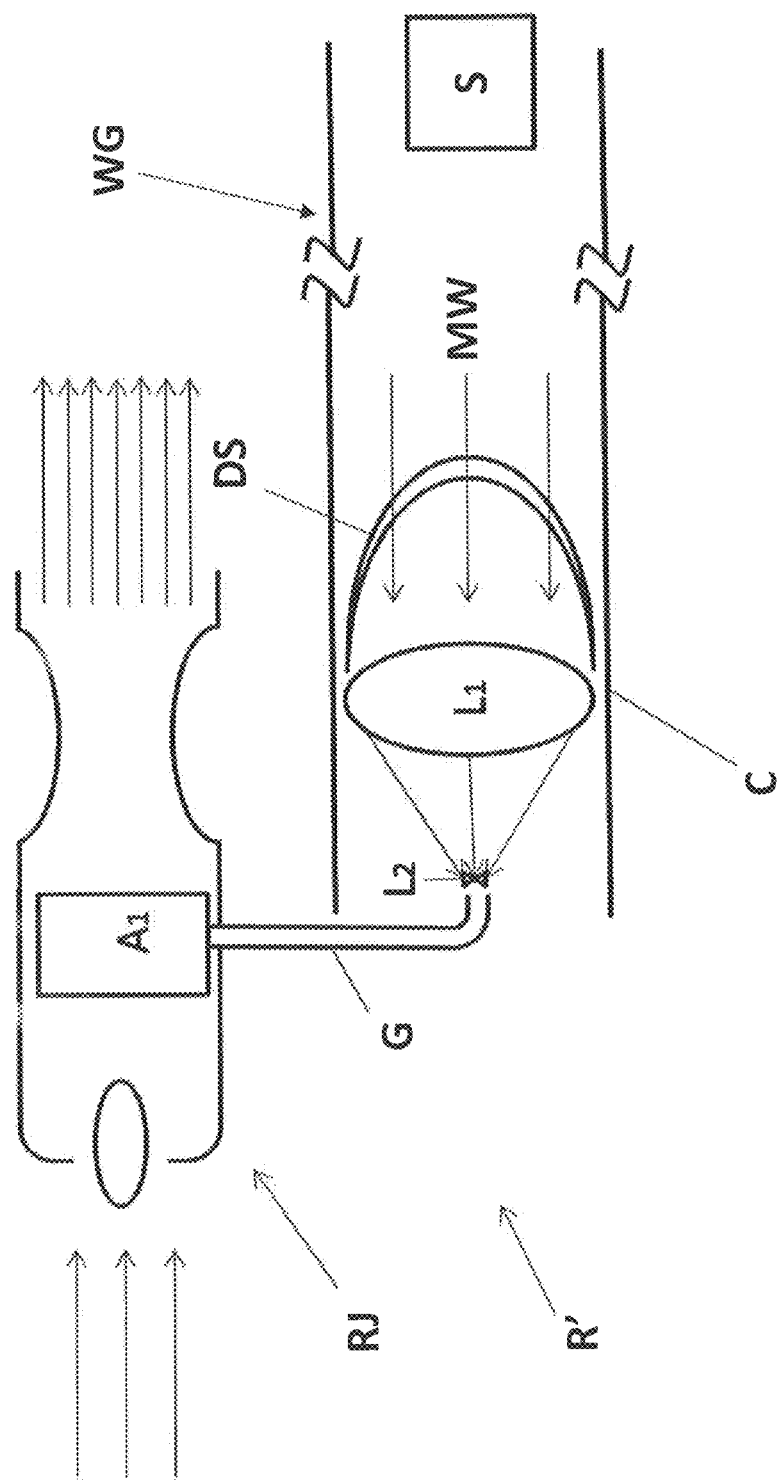
FIG. 9 illustrates a variant of the embodiment of the power supply system for a movable vehicle using microwaves depicted in FIG. 2 that includes a ramjet in which the air used for thrust, passes through nozzles attached to the vehicle.

In a further variant, a receiver R' including absorber $A_1$, as described in the embodiment in FIG. 3, is contemplated to be use the received microwave energy MW to power a ramjet engine RJ to impart thrust on vehicle V. In a simplified ramjet engine RJ, illustrated in FIG. 9, air enters a ramjet inlet nozzle before being forced into a heat exchanger, which can include absorber A1. However, in contrast to the conventional ramjet, the ramjet embodiments according to this application do not necessarily require a combustion chamber. Instead, as described in the other embodiments, the received microwave energy MW is absorbed by the heat exchanger/absorber $A_1$. This absorbed energy serves to increase the temperature of the air coming from the ramjet's inlet nozzle before it is expanded through the ramjet's exit nozzle at high pressure and/or high velocity to impart thrust onto the vehicle V. Thus, as the heat exchanger performs the same role as a conventional ramjet's combustion chamber, the heat exchanger can takes the place of a conventional ramjet's combustion chamber.

Figure 10:
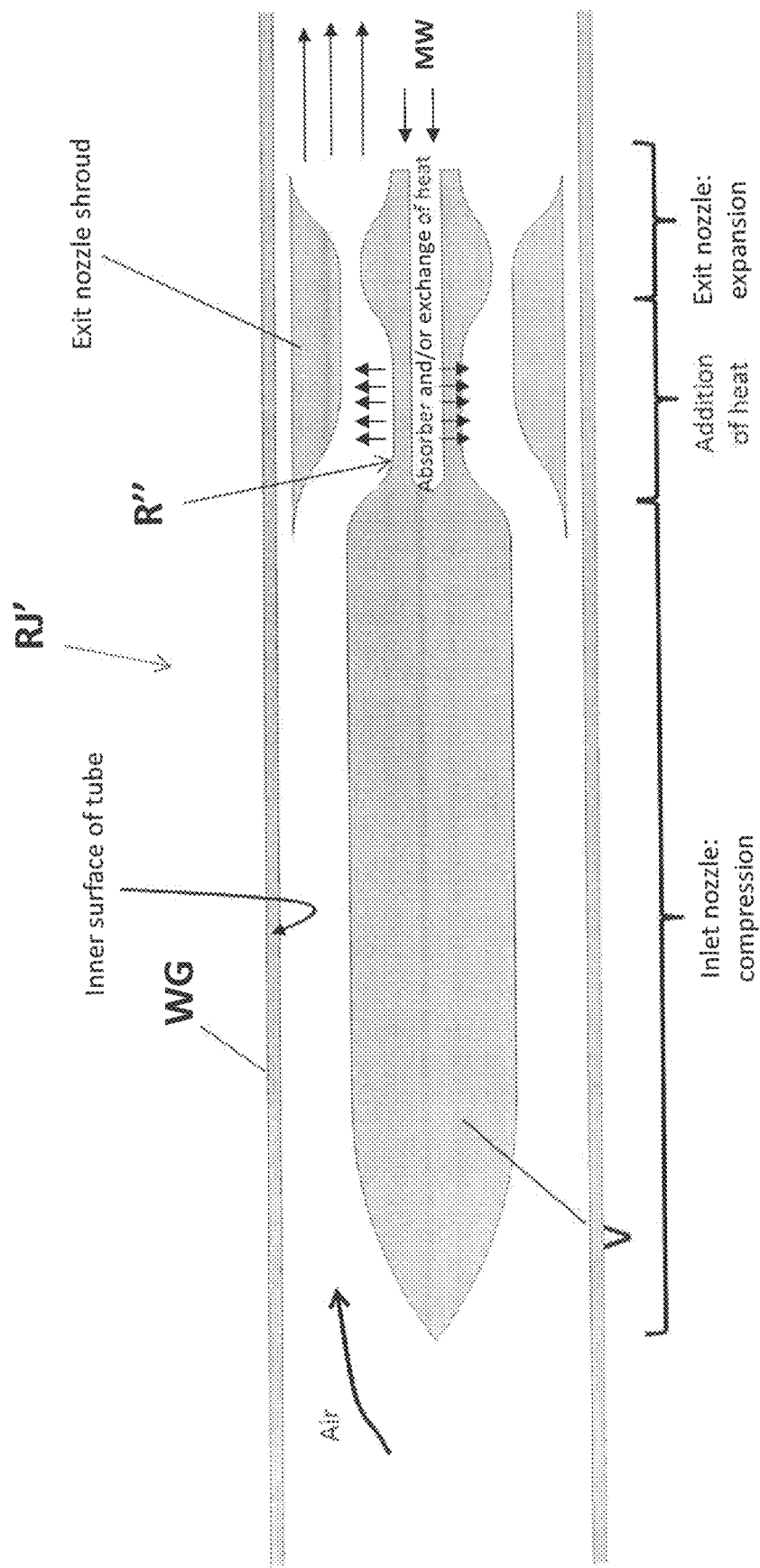
FIG. 10 illustrates a variant of the embodiment of the power supply system for a movable vehicle using microwaves, in which the walls of the stationary tube and the walls of the moving vehicle work together to form a part of a ramjet's inlet and outlet nozzles.

In another ramjet embodiment, the vehicle V (or pod) and the inner surface of the tube, which acts as a microwave waveguide WG, can be arranged to work in conjunction with the vehicle's outer surface to form the inlet nozzle of the ramjet RJ' and compress the incoming air. In the exemplary embodiment of FIG. 10, as the vehicle V moves through the tube in its direction of travel, i.e., to the left, the air flowing over the nose of vehicle V is compressed between the inner surface of the tube and outer surface of vehicle V. This performs a function similar to a compressor, except that there are no rotating turbomachinery rotors involved. Further, the end of vehicle V can be configured to act as a ramjet's exit nozzle. This performs a function similar to a turbine, except that, once again, there are no rotating turbomachinery rotors involved. The shroud can extend to a diameter larger than the vehicle's diameter, but not to contact the inner surface of the tube. It is to be understood that the heat exchanger depicted in this embodiment, which is configured to receive the microwave energy, can be structurally configured as any of the receivers disclosed in the other embodiments described in this specification without departing from the spirit and scope of the claimed embodiments.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims, in addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the invention has been described with reference to specific embodiments, those skilled in the art will understand that various changes may be made and equivalents may be substituted for elements thereof without departing from the true spirit and scope of the invention. While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the invention. Furthermore, the features of various implementing embodiments may be combined to form further embodiments of the invention.

What is claimed:

1. A system for converting transmitted energy to vehicle movement, comprising:
   a structure having an elongated tubular interior;
   a movable vehicle structured and arranged to move through the elongated tubular interior;
   at least one energy source arranged at a fixed location within the elongated tubular interior to transmit energy; and
   a receiver, carried by the movable vehicle, configured to receive the transmitted energy from the at least one energy source and to convert the received energy into at least one of electrical power or thrust for moving the vehicle,
   wherein the receiver comprises a heat exchanger.

2. The system according to claim 1, wherein the at least one source comprises a microwave energy source.

3. The system according to claim 2, wherein the elongated tubular interior is configured to act a waveguide to guide microwave energy transmitted from the microwave source to the at least one receiver.

4. The system according to claim 1, further comprising at least one vacuum source coupled to the elongated tubular structure to maintain the elongated tubular structure at a near vacuum pressure.

5. The system according to claim 1, wherein the at least one energy source comprises a plurality of energy sources distributed along a length of the elongated tubular structure.

6. The system according to claim 1, wherein the elongated tubular structure comprises at least one section having a reduced diameter, whereby, as the vehicle moves into the at least one reduced diameter section, forward motion of the vehicle is impeded.

7. The power supply system according to claim 1, wherein the vehicle comprises at least one exterior section being outwardly extensible, whereby, as the at least one section is extended outwardly, forward motion of the vehicle is impeded.

8. The system according to claim 1, wherein the heat exchanger comprises an absorber configured to absorb the received energy to generate heat.

9. The system according to claim 8, wherein the absorber comprises a plurality of air channels and the receiver further comprises a compressor configured for supplying pressurized air into the air channels and a turbine for receiving heated pressurized air from the absorber, which imparts rotational energy to the turbine.

10. The system according to claim 9, wherein the turbine is configured to at least one of rotate the compressor and generate electricity.

11. The system according to claim 9, wherein at least some of the heated pressurized air escapes from the turbine to impart thrust to the vehicle.

12. The system according to claim 9, wherein the compressor is structured to receive air from outside of the vehicle.

13. The system according to claim 9, further comprising a bypass fan for supplying air into the compressor.

14. The system according to claim 9, further comprising a fluid supply coupled to supply a fluid to the absorber.

15. The system according to claim 14, wherein the fluid in the fluid supply is one of nitrogen or air.

16. The system according to claim 9, further comprising a fluid supply structured and arranged to selectively supply a fluid under pressure into the air channels.

17. The system according to claim 8, further comprising microwave lenses and an internal waveguide coupled to the vehicle to receive and guide the energy transmitted from the energy source to the absorber.

18. The system according to claim 1, further comprising a ramjet engine coupled to the vehicle, the ramjet engine having inlet and outlet nozzles configured as converging type, diverging type or any converging-diverging combination of nozzles,
   wherein the heat exchanger is positioned between the inlet and exit nozzles.

19. The system according to claim 1, wherein the vehicle comprises a dielectric shell located on at least one end of the vehicle, the dielectric shell being structured to be invisible to the energy transmitted from the energy source.

20. The system according to claim 1, wherein the receiver comprises a plurality of rectennae configured to receive the energy transmitted from the energy source and to convert the received energy into electrical power.

21. The system according to claim 1, wherein the movable vehicle is a capsule or pod.

22. A power conversion system movable within a waveguide, comprising:
   an energy source arranged at a fixed location within the waveguide to transmit energy within the waveguide; and
   at least one receiver, which is configured for movement through the waveguide, being structured to convert the transmitted energy to at least one of electrical power or thrust for movement of the at least one receiver.

23. The power conversion system according to claim 22, wherein the energy source is a microwave source.

24. The power conversion system according to claim 22, wherein the at least one receiver comprises a heat exchanger.

25. The power conversion system according to claim 24, wherein the heat exchanger comprises an absorber configured to absorb the received energy to generate heat.

26. The power conversion system according to claim 25, wherein the absorber comprises a plurality of air channels and the at least one receiver further comprises a compressor configured for supplying pressurized air into the air channels and a turbine for receiving heated pressurized air from the absorber, which imparts rotational energy to the turbine.

27. The power conversion system according to claim 26, wherein the turbine is configured to at least one of rotate the compressor and generate electricity.

28. The power conversion system according to claim 26, wherein at least some of the heated pressurized air escapes from the turbine to impart thrust to the at least one receiver.

29. The power conversion system according to claim 26, wherein the compressor is structured to receive air from outside of the at least one receiver.

30. The power conversion system according to claim 26, further comprising a bypass fan for supplying air into the compressor.

* * * * *